United States Patent
Shiozaki et al.

(10) Patent No.: US 9,274,348 B2
(45) Date of Patent: Mar. 1, 2016

(54) DISPERSIVE DEVICE HAVING BEAM EXPANDING OPTICAL SYSTEM AND DISPERSIVE ELEMENT AND WAVELENGTH SELECTIVE SWITCH HAVING DISPERSIVE DEVICE

(71) Applicant: Sumitomo Electric Industries, Ltd., Osaka-shi (JP)

(72) Inventors: Manabu Shiozaki, Yokohama (JP); Hidehisa Tazawa, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/302,180

(22) Filed: Jun. 11, 2014

(65) Prior Publication Data

US 2014/0368916 A1 Dec. 18, 2014

(30) Foreign Application Priority Data

Jun. 12, 2013 (JP) ................. 2013-123826

(51) Int. Cl.
*G02B 5/18* (2006.01)
*G02B 27/42* (2006.01)
*G02B 27/10* (2006.01)
*G01J 3/14* (2006.01)
*G01J 3/18* (2006.01)
*G01J 3/02* (2006.01)

(52) U.S. Cl.
CPC ............ *G02B 27/4244* (2013.01); *G01J 3/0286* (2013.01); *G01J 3/14* (2013.01); *G01J 3/1804* (2013.01); *G02B 27/1006* (2013.01); *G02B 27/4283* (2013.01)

(58) Field of Classification Search
None
See application file for complete search history.

(56) References Cited

U.S. PATENT DOCUMENTS

| 6,621,958 B1 * | 9/2003 | Dueck et al. ................. 385/37 |
| 6,882,775 B1 | 4/2005 | Peng |
| 7,397,980 B2 | 7/2008 | Frisken |
| 7,709,354 B2 | 5/2010 | Stowe et al. |
| 2007/0280590 A1 * | 12/2007 | Stowe et al. ................. 385/19 |
| 2009/0022184 A1 * | 1/2009 | Ito et al. ......................... 372/20 |
| 2009/0154876 A1 | 6/2009 | McLaughlin et al. |
| 2010/0208262 A1 * | 8/2010 | Yoshida et al. ............... 356/328 |

FOREIGN PATENT DOCUMENTS

| JP | 2007-163780 A | 6/2007 |
| JP | 2010-237377 A | 10/2010 |
| JP | 2012-145373 A | 8/2012 |
| JP | 2012-145402 A | 8/2012 |

(Continued)

*Primary Examiner* — Arnel C Lavarias
(74) *Attorney, Agent, or Firm* — Venable LLP; Michael A. Sartori; Trent B. Ostler (57) ABSTRACT

A dispersive device has a beam expanding optical system which includes first and second prisms each having a pair of faces inclined relative to each other, and expands light containing a plurality of wavelength components by passing the light through each of the faces of the first and second prisms; and a dispersive element which emits the light expanded by the beam expanding optical system, at different diffraction angles by the respective wavelength components. A direction of variation of an output angle of the light emitted from the beam expanding optical system due to temperature change is configured to be a direction to suppress variation of the diffraction angles of the respective wavelength components emitted from the dispersive element due to the temperature change.

12 Claims, 8 Drawing Sheets

(56) References Cited

FOREIGN PATENT DOCUMENTS

| JP | 5166380 | B2 | 12/2012 |
| WO | WO-2007/029260 | | 3/2007 |
| WO | WO-2012/115077 | | 8/2012 |

* cited by examiner

Fig.7

DISPERSIVE DEVICE HAVING BEAM EXPANDING OPTICAL SYSTEM AND DISPERSIVE ELEMENT AND WAVELENGTH SELECTIVE SWITCH HAVING DISPERSIVE DEVICE

BACKGROUND OF THE INVENTION

1. Field of the Invention

One aspect of the present invention relates to a dispersive device and a wavelength selective switch.

2. Related Background Art

Japanese Patent Application Laid-Open Publication No. 2007-163780 discloses a multi-wavelength dispersive device applied to a wavelength selective switch. This device has two diffraction gratings. The first diffraction grating has an identical diffraction efficiency for p-polarized light and s-polarized light on the short wavelength side of an operating wavelength range and the second diffraction grating has an identical diffraction efficiency for p-polarized light and s-polarized light on the long wavelength side of the operating wavelength range. This configuration is intended to increase the angular dispersion and cancel out the wavelength dependence of diffraction efficiency, thereby reducing the wavelength dependence of diffraction efficiency.

U.S. Pat. Published Application No. 2009/0154876 describes a wavelength dispersive device having temperature compensation means. This wavelength dispersive device further has a prism for temperature compensation, in addition to an ordinary dispersive optical system. The prism for temperature compensation is disposed on optical paths of respective wavelength components dispersed by a diffraction grating.

SUMMARY OF THE INVENTION

An optical device, for example, such as a wavelength selective switch, uses an optical system for dispersing light containing a plurality of wavelength components into the respective wavelength components. The optical system of this kind is provided with a dispersive element having a dispersive means, e.g., a diffraction grating. When the light containing the plurality of wavelength components passes through this dispersive element, the light is emitted at different diffraction angles by their respective wavelengths.

However, the optical system of this kind has the following problem. A constituent material of the dispersive element usually expands or contracts with temperature change. For this reason, it is difficult to avoid linear expansion of the diffraction grating due to the temperature change, and as it changes the grating pitch of the diffraction grating, the diffraction angles of the respective wavelength components also vary. If this phenomenon occurs, for example, in the wavelength selective switch, an arrival position of a certain wavelength component on a light deflecting element will shift in a dispersion direction of the wavelength components in the diffraction grating. As a result, a wavelength component corresponding to an edge of a wavelength band will deviate from a deflection region of the light deflecting element, which narrows an available wavelength band.

When the prism for temperature compensation is further provided in addition to the ordinary dispersive optical system as in the wavelength dispersive device described in U.S. Pat. Published Application No. 2009/0154876, the number of parts increases, which is a cause of an impediment to downsizing of the optical system.

A dispersive device according to one aspect of the present invention comprises: a beam expanding optical system which included a first prism and a second prism each having a pair of faces inclined relative to each other, and expands light containing a plurality of wavelength components by passing the light through each of the faces of the first prism and the second prism; and a dispersive element which emits the light expanded by the beam expanding optical system, at different diffraction angles by the respective wavelength components, wherein a direction of variation of an output angle of the light emitted from the beam expanding optical system due to temperature change is configured to be a direction to suppress variation of the diffraction angles of the respective wavelength components emitted from the dispersive element due to the temperature change.

DETAILED DESCRIPTION OF THE EMBODIMENTS

Description of Embodiments

First, embodiments of the dispersive device and wavelength selective switch according to one aspect of the present invention will be described as enumerated below.

A dispersive device according to one embodiment comprises: a beam expanding optical system which includes a first prism and a second prism each having a pair of faces inclined relative to each other, and expands light containing a plurality of wavelength components by passing the light through each of the faces of the first prism and the second prism; and a dispersive element which emits the light expanded by the beam expanding optical system, at different diffraction angles by the respective wavelength components, wherein a direction of variation of an output angle of the light emitted from the beam expanding optical system due to the temperature change is configured to be a direction to suppress variation of the diffraction angles of the respective wavelength components emitted from the dispersive element due to the temperature change.

In a dispersive device according to one embodiment, a direction of variation of an output angle of the light emitted from the first prism due to the temperature change may be identical with a direction of variation of an output angle of the light emitted from the second prism due to the temperature change.

In a dispersive device according to one embodiment, a plus or minus sign of a refraction angle of the light in the first prism may be different from a plus or minus sign of a refraction angle of the light in the second prism, and plus or minus signs of refractive index changes of the first prism and the second prisms to the temperature change may be different from each other.

In a dispersive device according to one embodiment, the beam expanding optical system may include three or more prisms each having a pair of faces inclined relative to each other, and the first prism and the second prism may be two prisms located nearer to the dispersive element out of the three or more prisms.

In a dispersive device according to one embodiment, the beam expanding optical system may include N prisms (N is an even number of not less than 4), and the prisms other than the first prism and the second prism may be comprised of the same material as one prism of the first prism and the second prism and have the same apex angle as the one prism.

In a dispersive device according to one embodiment, a plus or minus sign of a refraction angle of the light in the first prism may be identical with a plus or minus sign of a refraction angle of the light in the second prism, and plus or minus signs of refractive index changes of the first prism and the second prism to the temperature change may be identical with each other.

In a dispersive device according to one embodiment, the beam expanding optical system may include three or more prisms each having a pair of faces inclined relative to each other, the three or more prisms may include the first prism and the second prism, and an optical axis of the light entering the beam expanding optical system may be parallel to an optical axis of the light emitted from the beam expanding optical system.

In a dispersive device according to one embodiment, plus or minus signs of the refractive index changes of the first prism and the second prism to the temperature change may be minus.

In a dispersive device according to one embodiment, the dispersive element may have a diffraction grating, and when an incident angle of the light to the diffraction grating is $\theta_{in}$, a diffraction angle of each of the wavelength component is $\theta_{out}$, a period of the diffraction grating is $\Lambda_g$, a beam magnification of the diffraction grating is $M_g$, an angular dispersion of the diffraction grating is $D_g$, a wavelength in vacuum of each of the wavelength component is $\lambda$, a temperature of the diffraction grating is T, and a refractive index of a medium around the first prism and the second prism is $n_0$, a temperature dependence ($d\theta_{out}/dT$) of the diffraction angle $\theta_{out}$ expressed by the formula below may be zero.

$$\frac{d\theta_{out}}{dT} = \frac{1}{M_g}\frac{d\theta_{in}}{dT} - D_g\lambda\left\{\frac{1}{n_0\Lambda_g}\frac{d}{dT}(n_0\Lambda_g)\right\}$$

In a dispersive device according to one embodiment, a change of the refractive index $n_0$ of the medium around the first prism and the second prism may be taken into account in the formula.

In a dispersive device according to one embodiment, a variation of an output angle of the light from the beam expanding optical system due to the temperature change may be set so as to substantially zero variations of the diffraction angles of the respective wavelength components emitted from the dispersive element due to the temperature change.

A wavelength selective switch according to one embodiment comprises: any one of the dispersive devices described above; an input section which inputs the light containing the plurality of wavelength components; a condensing element which condenses the plurality of wavelength components emitted from the dispersive device; a light deflecting element which independently deflects the plurality of wavelength components condensed by the condensing element by the respective wavelength components; and an output section which outputs the plurality of wavelength components deflected by the light deflecting element by the respective wavelength components.

The dispersive device and wavelength selective switch according to one embodiment successfully achieve the reduction of the influence due to the temperature change while reducing the number of parts.

DETAILS OF EMBODIMENT

An embodiment of the dispersive device and wavelength selective switch according to one aspect of the present invention will be described below in detail with reference to the accompanying drawings. In the description of the drawings the same elements will be denoted by the same reference signs, without redundant description. It should be noted herein that one aspect of the present invention is by no means intended to be limited solely to the illustration below. One aspect of the present invention is provided by the scope of claims and is intended to embrace all changes within the meaning and scope of equivalents to the scope of claims.

Figure 1:
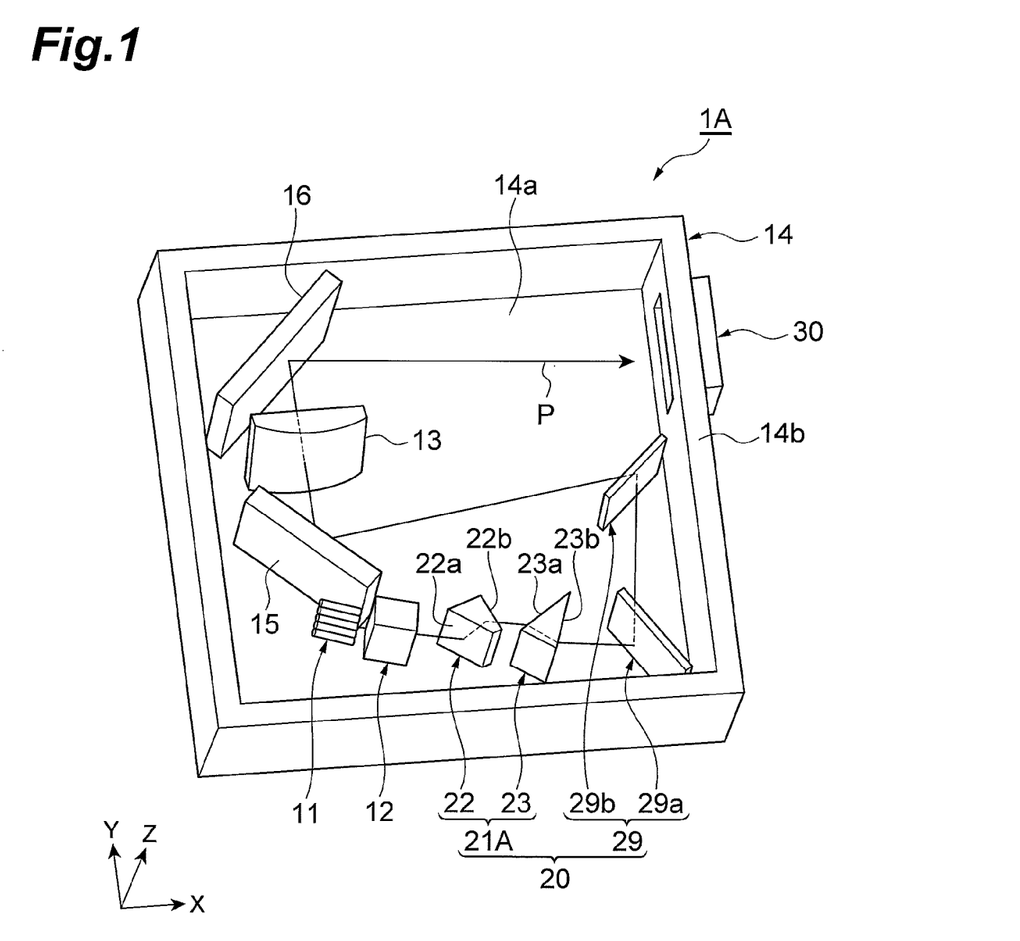
FIG. 1 is a perspective view showing a configuration of a wavelength selective switch having a dispersive device according to one embodiment.

FIG. 1 is a perspective view showing a configuration of a wavelength selective switch 1A having a dispersive device 20 according to the present embodiment. For easier understanding, the XYZ Cartesian coordinate system is shown in FIG. 1.

The wavelength selective switch 1A has a plurality of light ports 11, a collimator array 12, a condensing element 13, the dispersive device 20, a light deflecting element 30, and a housing 14 which houses the foregoing components. The housing 14 has a bottom face 14a along the XY plane and, the plurality of light ports 11, collimator array 12, condensing element 13, and dispersive device 20 are arranged on the bottom face 14a of the housing 14. The light deflecting element 30 is attached to a side wall 14b of the housing 14 surrounding the bottom face 14a.

The plurality of light ports 11 are arranged in parallel in a direction intersecting with the bottom face 14a of the housing 14 (e.g., in the Z-axis direction). One light port 11 out of the plurality of light ports 11 is an input section in the present embodiment. This light port 11 as input section is a port where light P containing a plurality of wavelength components is input from the outside of the wavelength selective switch 1A. The other light ports 11 of the plurality of light ports 11 serve as an output section in the present embodiment. These light ports as output section are ports where the plurality of wavelength components deflected by the light deflecting element 30 after dispersed by the below-described dispersive device 20 are output to the outside of the wavelength selective switch 1A by the respective wavelength components. The plurality of light ports 11 are suitably composed of optical waveguide members, e.g., optical fibers.

The collimator array 12 is optically coupled to the plurality of light ports 11. The collimator array 12 parallelizes (or collimates) the light P input from the light port 11 as input section, and then provides the light P to the dispersive device 20. The collimator array 12 condenses the dispersed wavelength components arriving from the light deflecting element 30, toward the respective corresponding light ports 11.

The dispersive device 20 has a dispersive structure for dispersing the light P containing the plurality of wavelength components, which has been input through the light port 11 as input section, into different optical paths by the respective wavelength components. Specifically, the dispersive device 20 of the present embodiment has a beam expanding optical system (beam expander) 21A and a dispersive element 29. The beam expanding optical system 21A receives the light P containing the plurality of wavelength components from the light port 11 as input section through the collimator array 12 and expands the light P in a direction intersecting with the array direction of the plurality of light ports 11, i.e., in a direction along the XY plane. The beam expanding optical system 21A reduces the width in the XY plane of the plurality of wavelength components deflected by the light deflecting element 30 after dispersed by the dispersive device 20, and then provides the wavelength components to the corresponding light ports 11 as output section through the collimator array 12.

The beam expanding optical system 21A of the present embodiment includes a first prism 22 and a second prism 23 arranged in juxtaposition in the optical-axis direction. The first prism 22 has a pair of faces 22a, 22b extending along the Z-axis and inclined relative to each other in the XY plane. Similarly, the second prism 23 has a pair of faces 23a, 23b extending along the Z-axis and inclined relative to each other in the XY plane. The light P containing the plurality of wavelength components is expanded in terms of width by passing through the faces 22a, 22b, 23a, and 23b in this order. Conversely, the plurality of wavelength components deflected by the light deflecting element 30 are reduced in terms of width by passing through the faces 23b, 23a, 22b, and 22a in this order.

The dispersive element 29 has diffraction gratings and emits the light P expanded by the beam expanding optical system 21A, at different diffraction angles by the respective wavelength components. The dispersive element 29 is composed, for example, of a pair of transmission type diffraction gratings 29a, 29b. The pair of transmissive diffraction gratings 29a, 29b intersect each at a significant angle with the optical axis of the light P in the XY plane. The light P emitted from the beam expanding optical system 21A passes through the transmissive diffraction gratings 29a, 29b in this order. At this time, since output angles of beams intensified by diffraction action are different depending upon their wavelengths, each wavelength component emitted from the light transmissive diffraction grating 29b is output into an optical path depending upon its wavelength. In this manner, the light P is dispersed in a direction along the XY plane. When the light P passes through the two transmissive diffraction gratings 29a, 29b as in the present embodiment, the dispersion angle of the wavelength components may be increased and the wavelength resolution may be enhanced.

The condensing element 13 is suitably composed, for example, of a condensing lens. The condensing element 13 condenses the wavelength components dispersed by the dispersive element 29, to different positions on the light deflecting element 30. In the present embodiment, reflecting mirrors 15, 16 are disposed in front of and behind the condensing element 13, and the optical paths of the respective wavelength components dispersed by the dispersive element 29 are bent by the reflecting mirror 15 to reach the condensing element 13 and thereafter are again bent by the reflecting mirror 16 to reach the light deflecting element 30.

The light deflecting element 30 is an element for independently deflecting the plurality of wavelength components condensed by the condensing element 13 by the respective wavelength components. The light deflecting element 30 may be, for example, a MEMS mirror array or a phase modulation element having a plurality of pixels. The MEMS mirror array is configured to have a plurality of reflective faces arranged in a line or in a two-dimensional array in the YZ plane, while angles of the respective reflective faces are made different bit by bit. The reflective face corresponding to each wavelength component out of the plurality of reflective faces of the light deflecting element 30 reflects each of the wavelength components condensed by the condensing element 13.

The wavelength components reflected on the light deflecting element 30 travel backward through the respective aforementioned paths of the light P to arrive at the respective light ports 11 as output section. At this time, since the optical paths of the respective optical components are made different depending upon their wavelengths by the light deflecting element 30, each wavelength component arrives at the light port 11 depending upon the wavelength component out of the plurality of light ports 11. In this manner, the plurality of wavelength components contained in the light P are selectively output from the respective light ports 11 depending upon their wavelengths.

Figure 2:
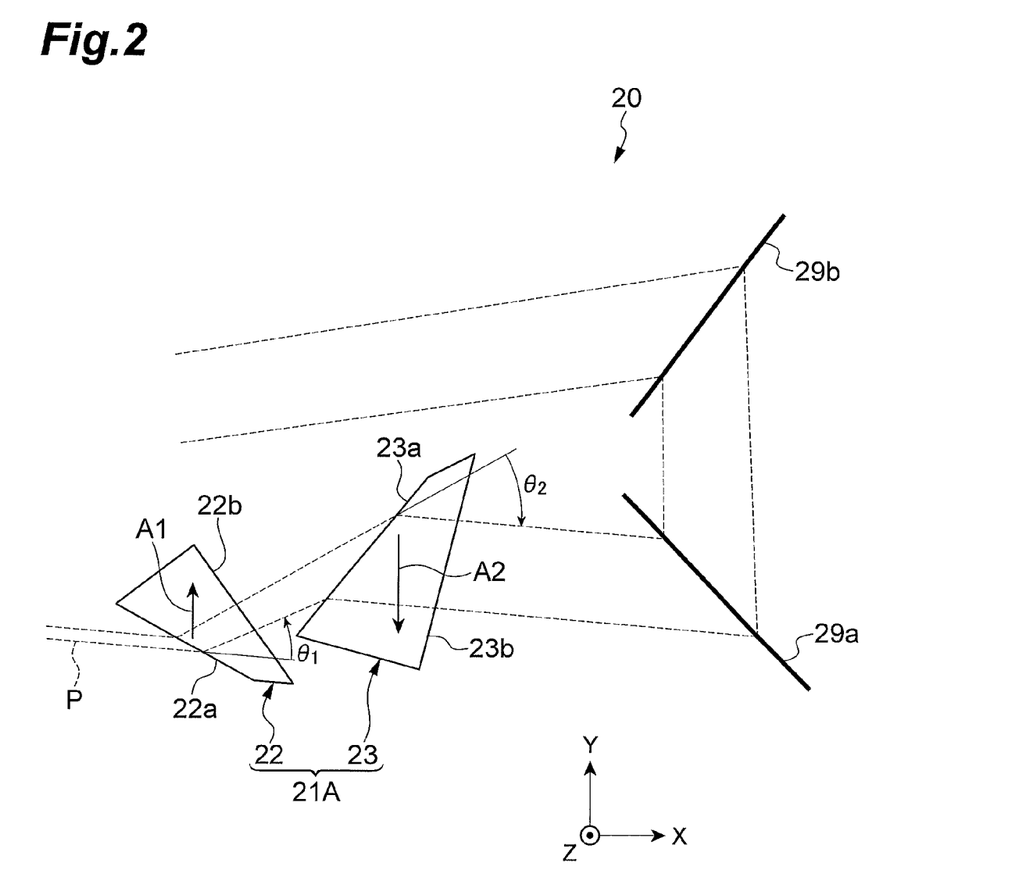
FIG. 2 is a top plan view showing an enlargement of a configuration of the dispersive device in the embodiment.

FIG. 2 is a top plan view showing an enlargement of the configuration of the dispersive device 20 in the present embodiment. In the present embodiment, the orientations of the first prism 22 and the second prism 23 with respect to the optical axis of the light P are different from each other. In FIG. 2, a direction in which the optical axis of the light P is changed by the first prism 22 of the beam expanding optical system 21A is indicated by arrow A1 in the drawing, and a direction in which the optical axis of the light P is changed by the second prism 23 is indicated by arrow A2 in the drawing. In the present embodiment, as shown in FIG. 2, the direction A1 of the change of the optical axis of the light P by the first prism 22 is opposite to the direction A2 of the change of the optical axis of the light P by the second prism 23. In other words, when angles are defined counterclockwise about the Z-axis, a refraction angle $\theta_1$ by the first prism 22 is plus whereas a refraction angle $\theta_2$ by the second prism 23 is minus. This configuration allows the optical axis of the light P at the entrance into the beam expanding optical system 21A and the optical axis of the light P at the exit from the beam expanding optical system 21A to be set parallel or close to parallel to each other, which can facilitate construction of the entire optical system.

A constituent material of each of the first prism 22 and the second prism 23 may be used, for example, glass (quartz or the like) whose ingredients are controlled so as to have the refractive index suitable for each of the wavelengths of the light P. In this case, temperature dependences of the refractive index of the first prism 22 and the second prism 23 are, for example, approximately from −10 ppm/K to 10 ppm/K.

Refractive indexes of the first prism 22 and the second prism 23 change with temperature change. Therefore, change in temperature inside the housing 14 will result in variation in the refraction angle $\theta_1$ of the light P emitted from the first prism 22 and the refraction angle $\theta_2$ of the light P emitted from the second prism 23. On the other hand, a constituent material of the dispersive element 29 also expands or contracts with the temperature change. For this reason, diffraction angles of the respective wavelength components vary with the temperature change.

Figure 3A:
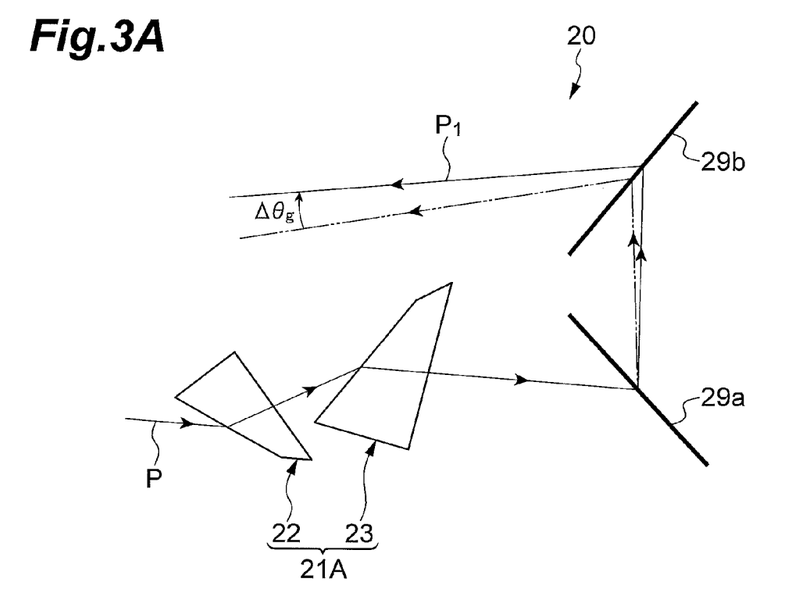
FIG. 3A and FIG. 3B are drawings showing a beam expanding optical system and a dispersive element.
Figure 3B:
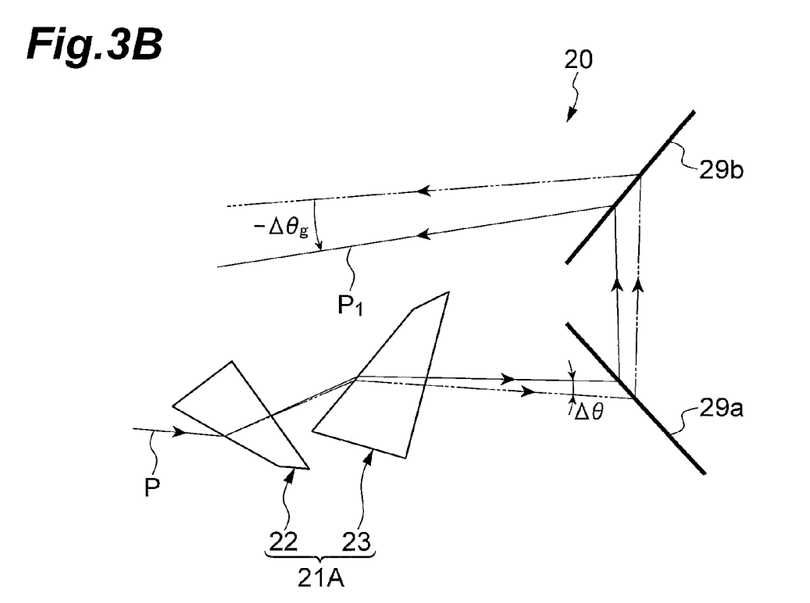

In the present embodiment, in order to reduce the variation of the diffraction angles of the respective wavelength components due to the temperature change, the temperature characteristic of the beam expanding optical system 21A is set so that a direction of variation of an output angle ($\theta_1+\theta_2$) of the light P emitted from the beam expanding optical system 21A due to the temperature change is configured to be a direction to suppress the variation of the diffraction angles of the respective components emitted from the dispersive element 29 due to the temperature change. FIGS. 3A and 3B are drawings schematically showing this concept, in which the beam expanding optical system 21A and the dispersive element 29 are shown. As shown in FIG. 3A, a case in which, with a temperature increase of $\Delta T°$ C., the diffraction angle of a certain wavelength component $P_1$ in the dispersive element 29 varies by $\Delta\theta_g$ will be considered here. In this case, as shown in FIG. 3B, the variation direction of a variation $\Delta\theta$ of the output angle of the light P in the beam expanding optical system 21A due to the temperature change is set to a direction to decrease $\Delta\theta_g$, whereby the diffraction angle of the wavelength component $P_1$ can be stabilized irrespective of the temperature change. More preferably, the variation $\Delta\theta$ of the output angle of the light P emitted from the beam expanding optical system 21A due to the temperature change is to be set so as to substantially zero variations $\Delta\theta_g$ of the diffraction angles of the respective wavelength components emitted from the dispersive element 29 due to the temperature change. A configuration for realizing such temperature characteristics of the first prism 22 and the second prism 23 will be described in detail below.

Figure 4A:
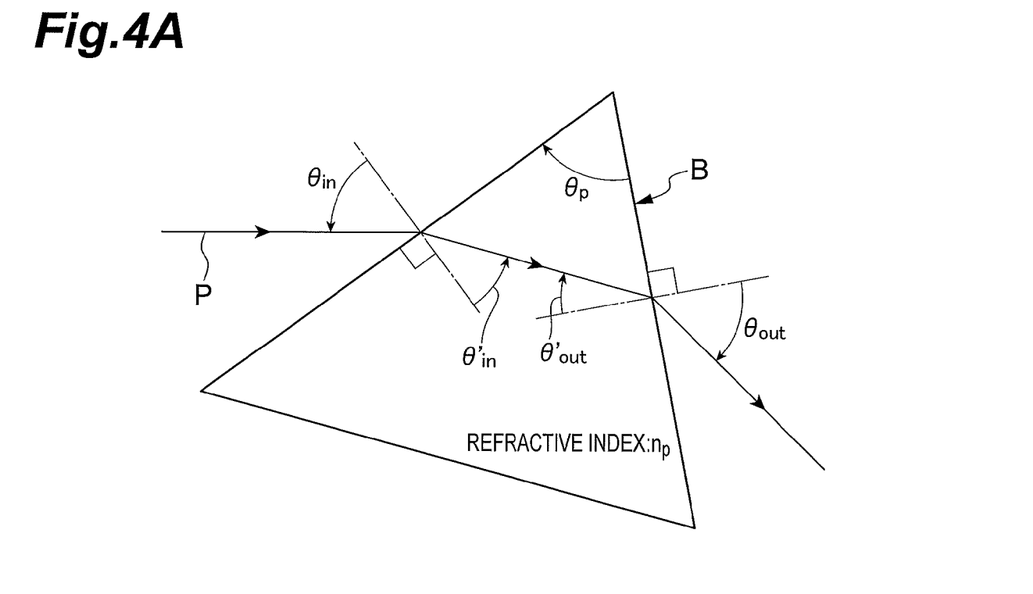
FIG. 4A and FIG. 4B are drawings for explaining temperature dependences of output angles in a prism and a diffraction grating.

First, theoretical formulae of temperature dependences of output angles in a prism and a diffraction grating are presented. As shown in FIG. 4A, an incident angle of the light P to a first face $b_1$ of a certain prism B is $\theta_{in}$, a refraction angle of the light P at the first face $b_1$ is $\theta'_{in}$, an incident angle of the light P to a second face $b_2$ is $\theta'_{out}$, an output angle of the light P at the second face $b_2$ is $\theta_{out}$, an apex angle between the first face $b_1$ and the second face $b_2$ is $\theta_p$, the refractive index of a material making up the prism B is $n_p$, and the refractive index of a medium around the prism B is $n_0$. Given this, the following formulae (1) hold, according to Snell's Law.

$$n_p \sin\theta'_{in} = n_0 \sin\theta_{in}$$

$$\theta'_{out} = \theta'_{in} + \theta_p$$

$$n_0 \sin\theta_{out} = n_p \sin\theta'_{out} \quad (1)$$

When an expansion ratio of the prism B (or diameter of output beam/diameter of input beam) is denoted by $M_p$, this ratio $M_p$ is represented by the following formula (2).

$$M_p = \frac{\cos\theta'_{in}\cos\theta_{out}}{\cos\theta_{in}\cos\theta'_{out}} \quad (2)$$

Based on the above formulae (1) and (2), the temperature dependence ($d\theta_{out}/dT$) of the output angle $\theta_{out}$ is expressed by formula (3) below, also taking the temperature dependence of the input angle $\theta_{in}$ into account. T represents the temperature of the prism B.

$$\frac{d\theta_{out}}{dT} = \frac{1}{M_g}\frac{d\theta_{in}}{dT} + \frac{\sin\theta_p}{\cos\theta'_{in}\cos\theta_{out}}\frac{d}{dT}\left(\frac{n_p}{n_0}\right) \quad (3)$$

Figure 4B:
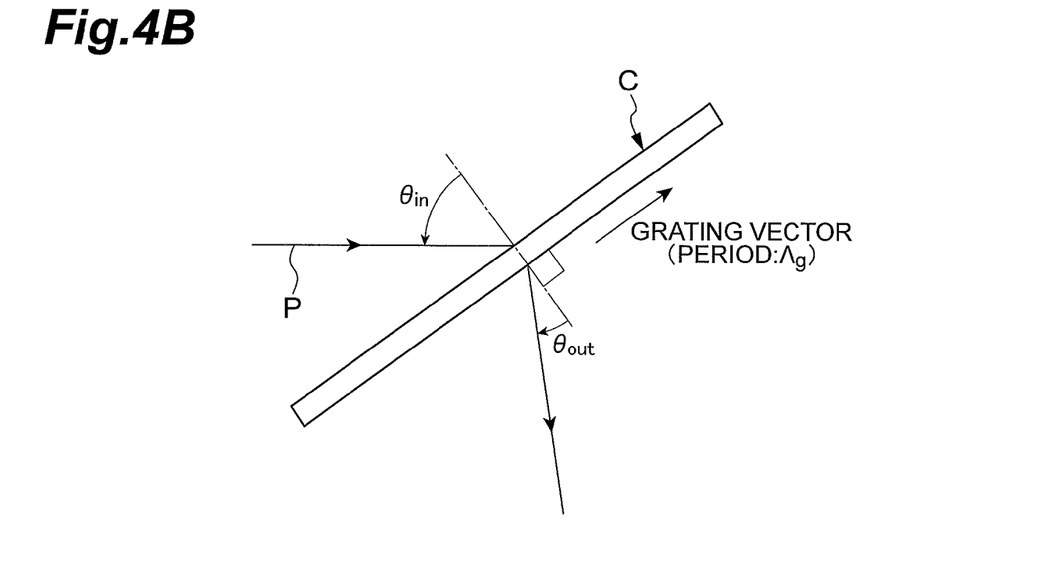

Next, the diffraction grating will be considered. As shown in FIG. 4B, When an incident angle of the light P to a certain diffraction grating C is $\theta_{in}$, a diffraction angle of a wavelength component $P_1$ is $\theta_{out}$, the period of the diffraction grating C is $\Lambda_g$, an order of diffraction is $m_g$, a beam magnification of the diffraction grating C is $M_g$, the angular dispersion (wavelength dependence of diffraction angle) is $D_g$, and the wavelength in vacuum of the wavelength component $P_1$ is $\lambda$, the following formulae (4) to (6) hold.

$$\sin\theta_{out} = \sin\theta_{in} + \frac{m_g\lambda}{n_0\Lambda_g} \quad (4)$$

$$M_g = \frac{\cos\theta_{out}}{\cos\theta_{in}} \quad (5)$$

$$D_g = \frac{m_g}{n_0\Lambda_g\cos\theta_{out}} \quad (6)$$

Based on the above formulae (4) to (6), the temperature dependence ($d\theta_{out}/dT$) of the diffraction angle $\theta_{out}$ is expressed by the following formula (7). T represents the temperature of the diffraction grating C.

$$\frac{d\theta_{out}}{dT} = \frac{1}{M_g}\frac{d\theta_{in}}{dT} - D_g\lambda\left\{\frac{1}{n_0\Lambda_g}\frac{d}{dT}(n_0\Lambda_g)\right\} \quad (7)$$

The temperature dependence $d\theta_{out}/dT$ of the output angle $\theta_{out}$ from the prism B is directly equivalent to the temperature dependence $d\theta_{in}/dT$ of the input angle $\theta_{in}$ to the diffraction grating C. While taking it into consideration, the parameters in formula (3) are determined so that when the foregoing formulae (3) and (7) are combined concerning the first prism 22, the second prism 23, and the transmissive diffraction gratings 29a and 29b, the temperature dependence of the final diffraction angles (i.e., the diffraction angle of the transmissive diffraction grating 29b) becomes smaller. In other words, the parameters in formula (3) are determined so that the direction of the variation of the output angle of the light P emitted from the beam expanding optical system 21A due to the temperature change is configured to be the direction to suppress the variation of the diffraction angles of the respective wavelength components emitted from the dispersive element 29 due to the temperature change. This can reduce the influence of the temperature change on the diffraction angles of the respective wavelength components emitted from the dispersive element 29. Preferably, the parameters in formula (3) are to be determined so as to substantially zero the variations of the output angles of the respective wavelength components emitted from the dispersive element 29 due to the temperature change, or so as to zero the temperature dependence ($d\theta_{out}/dT$) of the diffraction angle $\theta_{out}$ represented by the foregoing formula (7).

As shown by formula (7), each individual diffraction grating in the dispersive element 29 has the temperature dependence of output angles. Therefore, variations of output angles become larger with increase in the number of diffraction gratings (and with increasing angular dispersion); then, the first prism 22 and second prism 23 for suppressing (or compensating) the variation are also desired to have a greater temperature dependence.

The variation of the output angle from the beam expanding optical system 21A due to the temperature change ($\Delta\theta$ in FIG. 3B) is the sum ($\Delta\theta_1+\Delta\theta_2$) of the variation $\Delta\theta_1$ of the refraction angle $\theta_1$ by the first prism 22 and the variation $\Delta\theta_2$ of the refraction angle $\theta_2$ by the second prism 23 as shown in FIG. 2. When the plus or minus signs of these variations $\Delta\theta_1$ and $\Delta\theta_2$ are different from each other (more specifically, when the directions of the variations $\Delta\theta_1$ and $\Delta\theta_2$ are opposite to each other), $\Delta\theta_1$ and $\Delta\theta_2$ are subtracted from each other, and thus $\Delta\theta_1$ and $\Delta\theta_2$ need to take large values to obtain a sufficient variation $\Delta\theta$ as a whole of the beam expanding optical system 21A. On the other hand, when the plus or minus signs of these variations $\Delta\theta_1$ and $\Delta\theta_2$ are identical with each other (more specifically, when the directions of the variations $\Delta\theta_1$ and $\Delta\theta_2$ are the same), $\Delta\theta_1$ and $\Delta\theta_2$ are added and thus a sufficient variation $\Delta\theta$ can be obtained as a whole of the beam expanding optical system 21A even with small values of $\Delta\theta_1$ and $\Delta\theta_2$.

In the present embodiment, as described above, the orientations of the first prism 22 and the second prism 23 with respect to the optical axis of the light P are opposite to each other, and for this reason, the plus or minus sign of the refraction angle $\theta_1$ of the light P in the first prism 22 is different from that of the refraction angle $\theta_2$ of the light P in the second prism 23. In this case, for equalizing the variation directions of $\Delta\theta_1$ and $\Delta\theta_2$ in the temperature change with each other, the plus or minus sign of refractive index change of the first prism 22 to the temperature change is to be set different from that of refractive index change of the second prism 23.

A specific example of the beam expanding optical system 21A with the above-described temperature characteristic will be described below. A case where the first prism 22 and the second prism 23 are prisms having the same apex angle, refractive index, and temperature dependence of refractive index will be considered. It is assumed herein that the transmissive diffraction gratings 29a and 29b both are made of a silica glass substrate (with the linear expansion coefficient=0.51 ppm/K) in the period of 1.0352 μm (966 grooves/mm) and are used under the Bragg condition (i.e., under the condition that absolute values of input/output angles are equal) at the center wavelength of 1.55 μm. Furthermore, it is assumed that the surrounding medium is a gas hermetically enclosed in a container without volume change and the gas has no temperature dependence of refractive index (i.e., $dn_0/dT=0$).

When changes of the refractive index of the first prism 22 and the second prism 23 to the temperature change have the same plus or minus sign, in other words, when the plus or minus signs of temperature dependences $(dn_p/dT)$ of the refractive index $n_p$ thereof are the same, and in order to substantially zero the variations $\Delta\theta_g$ of the diffraction angles of the respective wavelength components emitted from the dispersive element 29 due to the temperature change, the necessary temperature dependence $(dn_p/dT)$ of the refractive index $n_p$ is $-12$ ppm/K, for example, in the case of the refractive index $n_p$ being 2.0 and the expansion ratio $M_p$ being 2.00. For example, in the case of the refractive index $n_p$ being 1.5 and the expansion ratio $M_p$ being 1.86, the necessary temperature dependence $(dn_p/dT)$ of the refractive index $n_p$ is $-10$ ppm/K. However, as long as the absolute value of the temperature dependence $(dn_p/dT)$ of the refractive index $n_p$ is a value smaller than the above, the first prism 22 and the second prism 23 can be readily realized with the use of optical glass and the toughness of the first prism 22 and the second prism 23 can be enhanced while lowering contents of fluorine and phosphate.

Then, a case where the first prism 22 and the second prism 23 are prisms wherein the plus or minus signs of their temperature dependences $(dn_p/dT)$ of the refractive index $n_p$ are different from each other (e.g., where the sign of the first prism 22 is plus and the sign of the second prism 23 is minus) will be considered. It is, however, assumed that the absolute values of the temperature dependences $(dn_p/dT)$ of these prisms 22, 23 are equal to each other. In this case, in order to substantially zero the variations $\Delta\theta_g$ of the diffraction angles of the respective wavelength components emitted from the dispersive element 29 due to the temperature change, the necessary temperature dependences $(dn_p/dT)$ of the refractive index $n_p$ are 3.9 ppm/K and $-3.9$ ppm/K, for example, in the case of the refractive index $n_p$ being 2.0 and the expansion ratio $M_p$ being 2.00. For example, in the case of the refractive index $n_p$ being 1.5 and the expansion ratio $M_p$ being 1.86, the necessary temperature dependences $(dn_p/dT)$ of the refractive index $n_p$ are 3.1 ppm/K and $-3.1$ ppm/K. In the present embodiment, as described above, the first prism 22 and the second prism 23 have the plus or minus signs of the temperature dependences $(dn_p/dT)$ of the refractive index $n_p$ opposite to each other, whereby the absolute value of the required temperature dependences $(dn_p/dT)$ of the refractive index $n_p$ can be remarkably reduced.

The reason for it is as follows. The second term of the right side of the foregoing formula (3) represents an angle change amount caused by the prism. The numerator of the second term of the right side includes $\sin(\theta_p)$. It is noted herein that in the present embodiment, as shown in FIG. 2, the plus or minus sign of the refraction angle $\theta_1$ in the first prism 22 is different from that of the refraction angle $\theta_2$ in the second prism 23. Namely, the first prism 22 and the second prism 23 have the opposite plus or minus signs of $\theta_p$, and thus $\sin(\theta_p)$ also takes the opposite plus or minus signs. As described previously, the variation $\Delta\theta$ of the output angle $(\theta_1+\theta_2)$ of the light P from the beam expanding optical system 21A due to the temperature change is the sum of the variation $\Delta\theta_1$ of the first prism 22 and the variation $\Delta\theta_2$ of the second prism 23. When the plus or minus of the temperature dependence $(dn_p/dT)$ of the refractive index $n_p$ of the first prism 22 is identical with that of the second prism 23, the variation $\Delta\theta_1$ of the first prism 22 and the variation $\Delta\theta_2$ of the second prism 23 are subtracted from each other. Therefore, in order to reduce the variations $\Delta\theta_g$ of the diffraction angles of the respective wavelength components in the dispersive element 29, it is necessary to increase the absolute value of the temperature dependences $(dn_p/dT)$ of the refractive index $n_p$. On the contrary, when the plus or minus sign of the temperature dependence $(dn_p/dT)$ of the refractive index $n_p$ of the first prism 22 is different from that of the second prism 23, the variation $\Delta\theta_1$ of the first prism 22 and the variation $\Delta\theta_2$ of the second prism 23 are added to each other. Therefore, the absolute value of the temperature dependences $(dn_p/dT)$ of the refractive index $n_p$ necessary for reducing the variations $\Delta\theta_g$ of the diffraction angles of the respective wavelength components in the dispersive element 29 may be reduced.

Since this arrangement increases a flexibility of prism design, it becomes easier to set the condition for the incident angles to the first prism 22 and the second prism 23 being 30° or more, in order to achieve a larger expansion ratio.

The effects achieved by the above-described dispersive device 20 and the wavelength selective switch 1A of the present embodiment will be described. In the dispersive device 20 of the present embodiment, as described above, the direction of the variation of the output angle $(\theta_1+\theta_2)$ of the light P emitted from the beam expanding optical system 21A due to the temperature change is configured to be the direction to suppress the variation of the output angles of the respective wavelength components emitted from the dispersive element 29 due to the temperature change. This reduces the influence of the temperature change on the diffraction angles of the respective wavelength components in the dispersive element 29. Since the above effect is achieved by devising the temperature dependence of the beam expanding optical system 21A which is essentially needed for expanding the light P, the increase in the number of parts can be prevented, for example, when compared with the configuration described in the specification of U.S. Pat. Published Application No. 2009/0154876.

As in the present embodiment, the direction of the variation of the output angle of the light P emitted from the first prism 22 due to the temperature change can be set to be identical with the direction of the variation of the output angle of the light P emitted from the prism 23 due to the temperature change. Since this arrangement reduces the absolute values of the temperature dependences $(dn_p/dT)$ of the refractive index $n_p$ required of the first prism 22 and the second prism 23, the toughness of the first prism 22 and the second prism 23 can be enhanced because the first prism 22 and the second prism 23 are possibly-formed by optical glass that can reduce the contents of fluorine and phosphate.

In the present embodiment, the plus or minus sign of the refraction angle $\theta_1$ of the light P in the first prism 22 is different from the plus or minus sign of the refraction angle $\theta_2$ of the light P in the second prism 23. In such a case, the plus or minus signs of refractive index changes of the first prism 22 and the second prism 23 to the temperature change, that is, the plus or minus signs of the temperature dependences $(dn_p/dT)$ of the refractive index $n_p$ may be different from each other. By this configuration, the direction of the variation of the output angle of the light P emitted from the first prism 22 due to the temperature change can be made identical with the direction of the variation of the output angle of the light P emitted from the second prism 23 due to the temperature change.

In the present embodiment, the beam expanding optical system 21A and the dispersive element 29 are housed in the housing 14. This configuration stabilizes the ambient temperature around the beam expanding optical system 21A and the dispersive element 29, thereby reducing the temperature change of the diffraction angles of the respective wavelength components in the dispersive element 29. It is assumed in the present embodiment that the beam expanding optical system 21A and the dispersive element 29 are hermetically enclosed in the housing 14 with a fixed volume and that there is no change in the refractive index of the surrounding gas due to the temperature change. However, if there is change in the volume (expansion/contraction) of the housing 14 or change in the refractive index $n_0$ of the surrounding gas due to the temperature change, it can be handled by finely adjusting the temperature dependences $(dn_p/dT)$ of the refractive index $n_p$ of the first prism 22 and the second prism 23, in accordance with the aforementioned formulae (3) and (7). The above discussion was based on the assumption that there was no change in the refractive index of the surrounding gas due to the temperature change and the description was given using $(dn_p/dT)$ as the temperature dependence of the refractive index $n_p$ and $(d\Lambda_g/dT)$ as the linear expansion coefficient of the diffraction gratings. However, when the refractive index change of the surrounding gas due to the temperature change is taken into account, the same discussion can also be made by substituting $(n_p/n_0)$ for $n_p$ used above and $n_0\Lambda_g$ for $\Lambda_g$.

First Modification

Figure 5A:
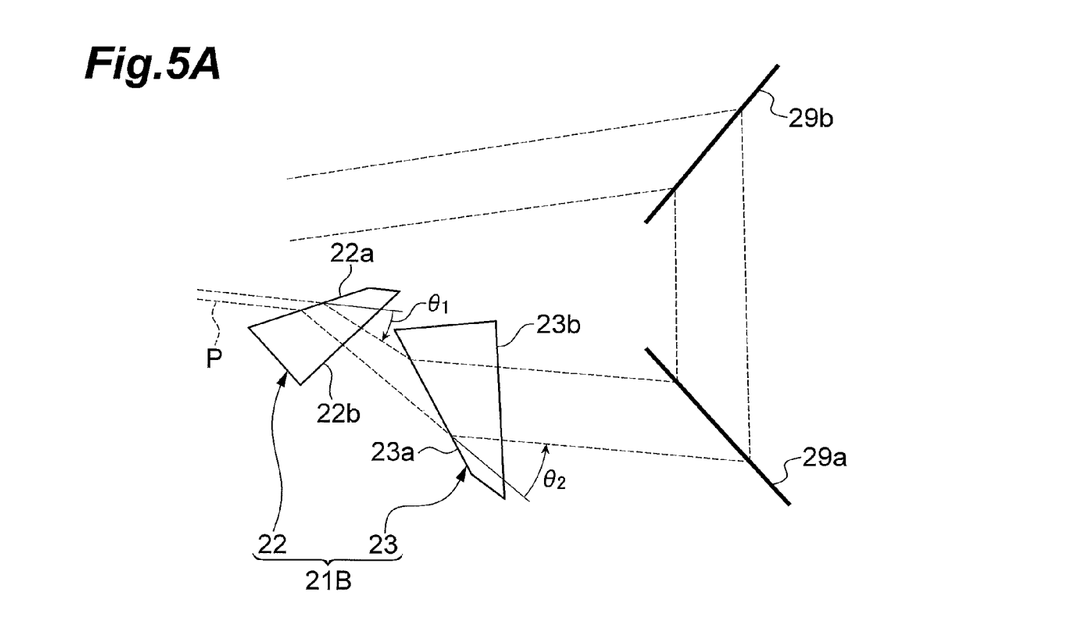
FIG. 5A and FIG. 5B are top plan views showing a configuration of the beam expanding optical system according to a first modification example.

FIG. 5A is a top plan view showing a configuration of a beam expanding optical system 21B according to a first modification example of the above embodiment. In the beam expanding optical system 21B of the present modification example, the orientations of the first prism 22 and the second prism 23 with respect to the optical axis of the light P are different from those in the beam expanding optical system 21A of the above embodiment. Namely, when angles are defined counterclockwise about the Z-axis, in the present modification example, the refraction angle $\theta_1$ by the first prism 22 is minus and the refraction angle $\theta_2$ by the second prism 23 is plus. This configuration, just as in the case of the above embodiment, allows the optical axis of the light P at the entrance of the beam expanding optical system 21B to be set parallel or close to parallel to the optical axis of the light P at the exit of the beam expanding optical system 21B, which facilitates construction of the entire optical system.

Figure 5B:
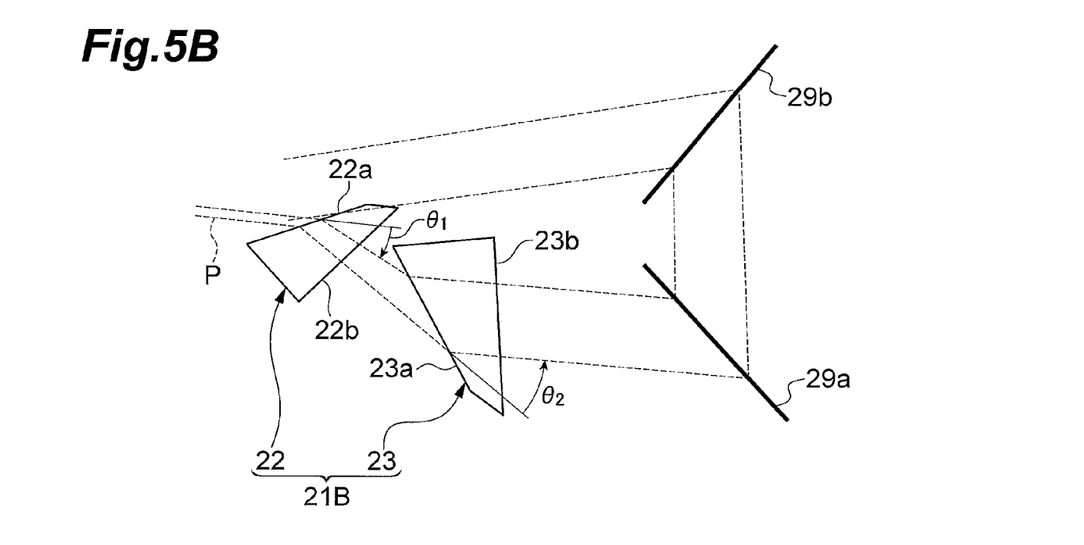

However, if the plurality of wavelength components dispersed by the pair of transmissive diffraction gratings 29a, 29b of the dispersive element 29 pass near the beam expanding optical system 21B, the first prism 22 may interfere with the optical paths of the wavelength components, as shown in FIG. 5B, depending upon the orientations of the first prism 22 and the second prism 23. Therefore, in order to avoid this situation, it becomes necessary to increase the gap between the beam expanding optical system 21B and the optical paths of the wavelength components, which can be a cause of an impediment to downsizing of the entire device. For this reason, the orientations of the first prism 22 and the second prism 23 with respect to the optical axis of the light P are desirably to be determined in consideration to the positional relationship with the optical paths passing nearby.

Second Modification

Figure 6:
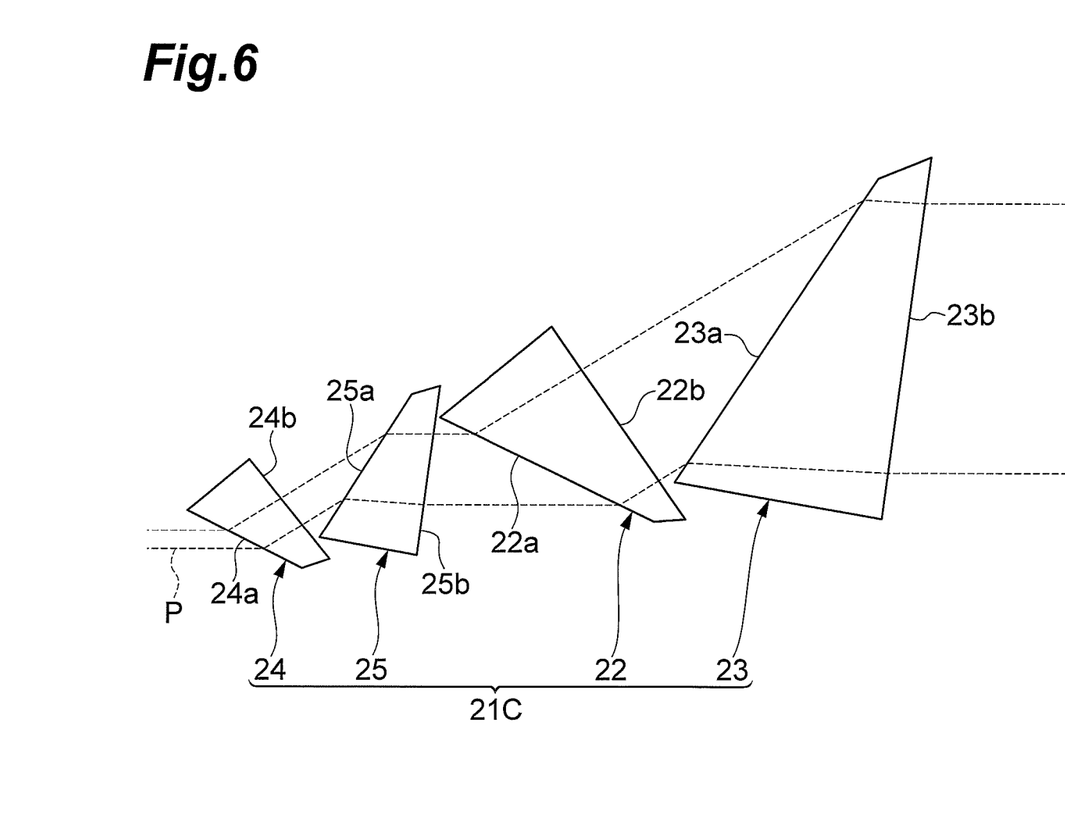
FIG. 6 is a top plan view showing a configuration of the beam expanding optical system according to a second modification example.

FIG. 6 is a top plan view showing a configuration of a beam expanding optical system 21C according to a second modification example of the above embodiment. The beam expanding optical system 21C of the present modification example further includes prisms 24 and 25 arranged in juxtaposition in the optical-axis direction of the light P, in addition to the two prisms in the above embodiment (the first prism 22 and the second prism 23).

The prism 24 has a pair of faces 24a, 24b extending along the Z-axis and inclined relative to each other in the XY plane. Similarly, the prism 25 has a pair of faces 25a, 25b extending along the Z-axis and inclined relative to each other in the XY plane. The light P containing the plurality of wavelength components is expanded by passing through the faces 24a, 24b, 25a, and 25b in this order and further passing through the faces 22a, 22b, 23a, and 23b in this order. Inversely, the plurality of wavelength components deflected by the light deflecting element 30 is reduced by passing through the faces 23b, 23a, 22b, and 22a in this order and further passing through the faces 25b, 25a, 24b, and 24a in this order.

As in the present modification example, the beam expanding optical system may include three or more prisms (four prisms in the present modification example) each having a pair of faces inclined relative to each other. The wavelength resolution can be further enhanced by increasing the number of prisms forming the beam expanding optical system, as in the above example. In this case, the first prism 22 and the second prism 23 for suppressing the variation of the diffraction angles of the dispersive element 29 due to the temperature change can be the two prisms located nearer to the dispersive element 29 out of the three or more prisms, as in the present modification example. In accordance with the formula (3), as the influence of change in the incident angle of a latter prism, i.e., change in the output angle from a former prism on the output angle from the latter prism is a value of a division thereof by a prism expansion ratio, the influence of the change of the output angle becomes less at former prisms. Therefore, when the first and second prisms are defined as the two prisms located nearer to the dispersive element 29 as in the above case, the variation of the diffraction angles of the dispersive element 29 due to the temperature change can be effectively suppressed.

When the beam expanding optical system includes N prisms (N is an even number of 4 or more) as in the present modification example, the prisms 24, 25 other than the first prism 22 and the second prism 23 can be made of the same material as one of the first prism 22 and the second prism 23 and have the same apex angle $\theta_p$ as the one prism. This makes the prisms used as the prisms 24, 25 common in type to the prism used as either the first prism 22 or the second prism 23, which allows reduction in types of components forming the beam expanding optical system.

In an example, the prisms 23, 24, and 25 are prisms made of the same material and the prism 22 is only a prism made of a different material. When the refractive index of the surrounding gas is constant, the temperature dependences ($dn_p/dT$) of refractive index $n_p$ of the glass materials are −2.7 ppm/K and 2.6 ppm/K, respectively. The expansion ratio by the entire beam expanding optical system 21C is, for example, 15-fold. In the present modification example, only the prism 22 has the plus sign of the temperature dependence ($dn_p/dT$) of the refractive index $n_p$. For more effectively suppressing the variation of the diffraction angles of the dispersive element 29 due to the temperature change, the temperature dependence ($dn_p/dT$) of the refractive index $n_p$ of the prism 24 can also be set to plus. However, since the influence of the prism 24 on the variation of the diffraction angles of the dispersive element 29 due to the temperature change is reduced because of expansion of the width of the light P by the prisms 22, 23, there will arise no problem if both of the temperature dependences ($dn_p/dT$) of the prisms 24 and 25 are minus.

Third Modification

Figure 7:
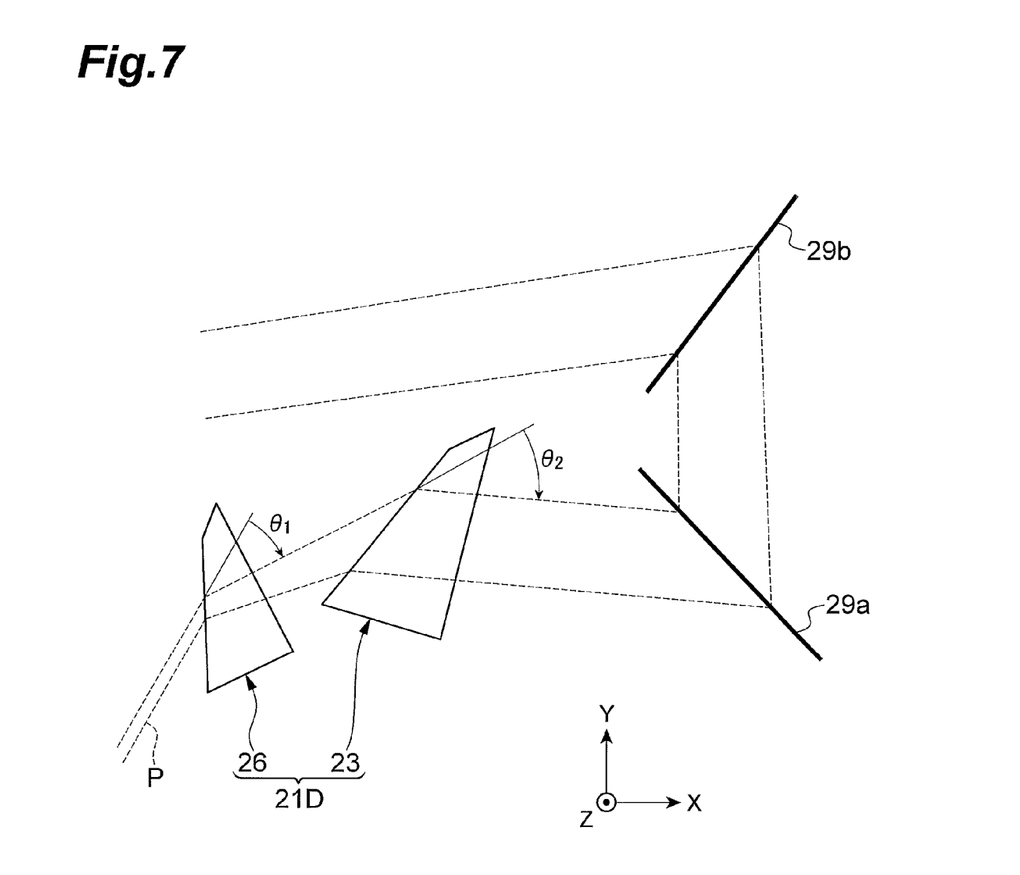
FIG. 7 is a top plan view showing a configuration of the beam expanding optical system according to a third modification example.

FIG. 7 is a top plan view showing a configuration of a beam expanding optical system 21D according to a third modification example of the above embodiment. The beam expanding optical system 21D in the present modification example is different from the above embodiment in the orientation of the first prism with respect to the optical axis of the light P. In the above embodiment, as shown in FIG. 2, the orientations of the first prism 22 and the second prism 23 with respect to the optical axis of the light P are different from each other and when angles are defined counterclockwise about the Z-axis, the refraction angle $\theta_1$ by the first prism 22 is plus and the refraction angle $\theta_2$ by the second prism 23 is minus. In contrast thereto, in the present modification example, as shown in FIG. 7, the orientations of the first prism 26 and the second prism 23 with respect to the optical axis of the light P are identical, and the refraction angle $\theta_1$ by the first prism 26 and the refraction angle $\theta_2$ by the second prism 23 have the same plus or minus sign (minus in the present modification example).

Even in this case, if the plus or minus signs of the temperature dependences ($dn_p/dT$) of the refractive index $n_p$ of the first prism 26 and the second prism 23 are identical with each other, the direction of the variation of the refraction angle $\theta_1$ due to the temperature change (more specifically, the plus or minus sign of $\Delta\theta_1$) can be made identical with the direction of the variation of the refraction angle $\theta_2$ due to the temperature change (more specifically, the plus or minus sign of $\Delta\theta_2$). Therefore, the same effects as in the first embodiment can be suitably achieved. In an example, the first prism 26 and the second prism 23 are prisms of the same material.

Fourth Modification

Figure 8:
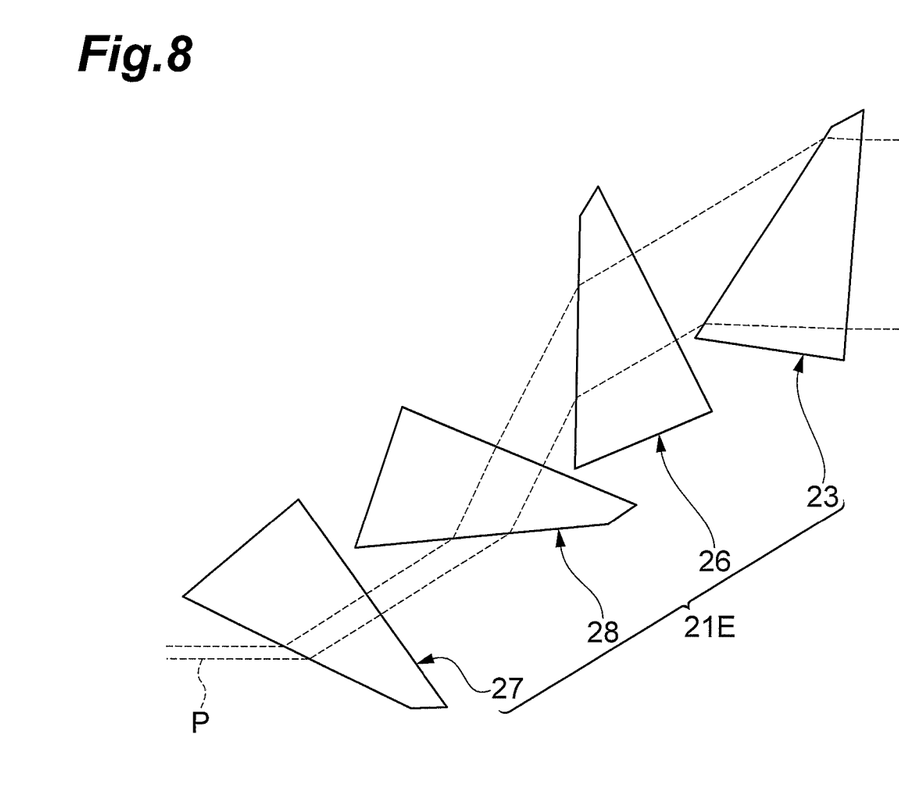
FIG. 8 is a top plan view showing a configuration of the beam expanding optical system according to a fourth modification example.

FIG. 8 is a top plan view showing a configuration of a beam expanding optical system 21E according to a fourth modification example of the above embodiment. In the present modification example, as in the third modification example, the beam expanding optical system 21E includes the first prism 26 and second prism 23. The material and apex angle $\theta_p$ of the first prism 26 are the same as those in the third modification example, but in the present modification example, the size of the first prism 26 is identical with that of the second prism 23.

The beam expanding optical system 21E in the present modification example includes prisms 27 and 28 arranged in juxtaposition in the optical-axis direction of the light P, in addition to the first prism 26 and the second prism 23. The material and apex angle $\theta_p$ of the prisms 27 and 28 are the same as those of the first prism 26 and the second prism 23. The size of the prisms 27 and 28 is identical with that of the first prism 26 and the second prism 23. This makes all the prisms used as the prisms 23, 26-28 common, which can reduce types of the components forming the beam expanding optical system. The light P is expanded by passing through the prisms 27, 28, 26, and 23 in this order. Inversely, the plurality of wavelength components deflected by the light deflecting element 30 is reduced by passing through the prisms 23, 26, 28, and 27 in this order.

As in the present modification example, the beam expanding optical system may include three or more prisms (four prisms in the present modification example) each having a pair of faces inclined relative to each other. The wavelength resolution can be further enhanced by increasing the number of prisms forming the beam expanding optical system as in this example. When the orientations of the first prism 26 and the second prism 23 with respect to the optical axis of the light P are identical and when the refraction angle $\theta_1$ by the first prism 26 and the refraction angle $\theta_2$ by the second prism 23 have the same plus or minus sign as in the third modification example and the present modification example, $\Delta\theta$ can be made larger because of addition of variations of the output angle of the light P emitted from the beam expanding optical system due to the temperature change. Therefore, the variation of the diffraction angles by the dispersive element 29 due to the temperature change can be more effectively suppressed.

When the orientations of the first prism 26 and the second prism 23 with respect to the optical axis of the light P are identical and the beam expanding optical system includes three or more prisms (four prisms in the present modification example) as in the present modification example, the orientations of the prisms 27, 28 other than the first prism 26 and the second prism 23 may be made different from those of the first prism 26 and the second prism 23. This configuration allows the optical axis of the light P incident to the beam expanding optical system 21E to be set parallel or close to parallel to the optical axis of the light P output from the beam expanding optical system 21E, which can facilitate construction of the entire optical system.

In an example, the prisms 23, 26-28 are prisms of the same material. When the refractive index of the surrounding gas is constant, the temperature dependence ($dn_p/dT$) of the refractive index $n_p$ of the glass material is −3.7 ppm/K.

The dispersive device and wavelength selective switch according to one aspect of the present invention, which do not have to be limited only to the above-described embodiment, can be modified in many ways. For example, the above embodiment and each of the modification examples showed the examples of two transmissive diffraction gratings as the dispersive element, but the dispersive element can be composed of at least one transmissive diffraction grating. Examples of such configurations include a Littman-Metcalf type and a double path monochromator.

What is claimed is:

1. A dispersive device comprising:
   a beam expanding optical system which includes a first prism and a second prism each having a pair of faces inclined relative to each other, and expands light containing a plurality of wavelength components by passing the light through each of the faces of the first prism and the second prism; and
   a dispersive element which emits the light expanded by the beam expanding optical system, at different diffraction angles by the respective wavelength components,
   wherein a direction of variation of an output angle of the light emitted from the beam expanding optical system due to temperature change is configured to be a direction to suppress variation of the diffraction angles of the respective wavelength components emitted from the dispersive element due to the temperature change.

2. The dispersive device according to claim 1, wherein a direction of variation of an output angle of the light emitted from the first prism due to the temperature change is identical with a direction of variation of an output angle of the light emitted from the second prism due to the temperature change.

3. The dispersive device according to claim 2, wherein a plus or minus sign of a refraction angle of the light in the first prism is different from a plus or minus sign of a refraction angle of the light in the second prism, and
   wherein plus or minus signs of refractive index changes of the first prism and the second prism to the temperature change are different from each other.

4. The dispersive device according to claim 3, wherein the beam expanding optical system includes three or more prisms each having a pair of faces inclined relative to each other, and
   wherein the first prism and the second prism are two prisms located nearer to the dispersive element out of the three or more prisms.

5. The dispersive device according to claim 4, wherein the beam expanding optical system includes N prisms where N is an even number of 4 or more, and
   wherein the prisms other than the first prism and the second prism are comprised of a same material as one prism of the first prism and the second prism and have the same apex angle as the one prism.

6. The dispersive device according to claim 2, wherein a plus or minus sign of a refraction angle of the light in the first prism is identical with a plus or minus sign of a refraction angle of the light in the second prism, and
   wherein plus or minus signs of refractive index changes of the first prism and the second prism to the temperature change are identical with each other.

7. The dispersive device according to claim 6, wherein the beam expanding optical system includes three or more prisms each having a pair of faces inclined relative to each other,
   wherein the three or more prisms includes the first prism and the second prism, and
   wherein an optical axis of the light entering the beam expanding optical system is parallel to an optical axis of the light emitted from the beam expanding optical system.

8. The dispersive device according to claim 6, wherein plus or minus signs of the refractive index changes of the first prism and the second prism to the temperature change are minus.

9. The dispersive device according to claim 1, wherein the dispersive element has a diffraction grating, and
   wherein when an incident angle of the light to the diffraction grating is $\theta_{in}$, a diffraction angle of each of the wavelength component is $\theta_{out}$, a period of the diffraction grating is $\Lambda_g$, a beam magnification of the diffraction grating is $M_g$, an angular dispersion of the diffraction grating is $D_g$, a wavelength in vacuum of each of the wavelength component is $\lambda$, a temperature of the diffraction grating is T, and a refractive index of a medium around the first prism and the second prism is no, a temperature dependence $d\theta_{out}/dT$ of the diffraction angle $\theta_{out}$ expressed by the formula below is zero $$\frac{d\theta_{out}}{dT} = \frac{1}{M_g}\frac{d\theta_{in}}{dT} - D_g\lambda\left\{\frac{1}{n_0\Lambda_g}\frac{d}{dT}(n_0\Lambda_g)\right\}.$$

10. The dispersive device according to claim 9, wherein a change of the refractive index no of the medium around the first prism and the second prism is taken into account in the formula.

11. The dispersive device according to claim 1, wherein a variation of the output angle of the light from the beam expanding optical system due to the temperature change is set so as to substantially zero variations of the diffraction angles of the respective wavelength components emitted from the dispersive element due to the temperature change.

12. A wavelength selective switch comprising:
    the dispersive device according to claim 1;
    an input section which inputs the light containing the plurality of wavelength components;
    a condensing element which condenses the plurality of wavelength components emitted from the dispersive device;
    a light deflecting element which independently deflects the plurality of wavelength components condensed by the light condensing element by the respective wavelength components; and
    an output section which outputs the plurality of wavelength components deflected by the light deflecting element by the respective wavelength components.

* * * * *